(12) United States Patent  
Fukuda et al.

(10) Patent No.: US 6,965,186 B2  
(45) Date of Patent: Nov. 15, 2005

(54) ELECTRIC MOTOR FOR HYBRID VEHICLES

(75) Inventors: Takeo Fukuda, Kawachi-gun (JP); Kenji Fukuda, Shioya-gun (JP); Noritaka Yamaguchi, Kawachi-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/752,226

(22) Filed: Jan. 7, 2004

(65) Prior Publication Data

US 2004/0189140 A1 Sep. 30, 2004

(30) Foreign Application Priority Data

Jan. 15, 2003 (JP) .................................... P2003-007129

(51) Int. Cl.[7] .................................................. H02K 1/22
(52) U.S. Cl. .................. 310/261; 310/264; 310/156.12; 310/156.13
(58) Field of Search .................. 310/261, 66, 67 R, 310/156.58, 156.11, 156.12, 262, 264, 270

(56) References Cited

U.S. PATENT DOCUMENTS

| | | | | |
|---|---|---|---|---|
| 4,628,891 A | * | 12/1986 | Asai et al. ................... | 123/599 |
| 5,258,678 A | * | 11/1993 | Futami ................... | 310/156.53 |
| 5,796,195 A | * | 8/1998 | Miyakawa ................ | 310/68 B |
| 6,133,659 A | * | 10/2000 | Rao ............................ | 310/89 |

FOREIGN PATENT DOCUMENTS

| | | |
|---|---|---|
| JP | 05-115150 A | 5/1993 |
| JP | 06-038415 A | 2/1994 |
| JP | 09-182211 A | 7/1997 |
| JP | 11-332010 | 11/1999 |
| JP | 11-346467 A | 12/1999 |
| JP | 2002-199626 A | 7/2002 |
| JP | 2003-048438 A | 2/2003 |

* cited by examiner

*Primary Examiner*—Darren Schuberg  
*Assistant Examiner*—Leda Pham  
(74) *Attorney, Agent, or Firm*—Westerman, Hattori, Daniels & Adrian, LLP

(57) ABSTRACT

An electric motor for a hybrid vehicle includes a rotor disposed and coupled between an internal combustion engine and a transmission, the rotor being coupled, at one end thereof in a direction of a rotation axis, to a crank shaft of the internal combustion engine and, at the other end, to the transmission via a drive plate; a through hole provided to extend in the direction of the rotation axis through the rotor; a fastening hole provided respectively in an end face of the crank shaft and in the drive plate to face, and be in communication with, the through hole; and a fastening member mounted in the through hole and in each of the fastening holes such that the rotor is fixed between the crank shaft and the drive plate. A desired performance is secured easily while preventing an excess increase in the cost for producing rotors.

9 Claims, 11 Drawing Sheets

ELECTRIC MOTOR FOR HYBRID VEHICLES

BACKGROUND OF THE INVENTION

1. Field of the Invention

The present invention relates to an electric motor for a hybrid vehicle.

2. Background Art

Conventionally, an electric motor for a hybrid vehicle is known which has a rotor disposed and coupled between an internal combustion engine and a transmission, the rotor being coupled to the crank shaft of the internal combustion engine and via a drive plate to the transmission (For example, see Japanese Patent Application Unexamined Publication No. 11-332010 (FIG. 4)).

In this electric motor for a hybrid vehicle, a coupling shaft or the like, for example, is provided that is pressed into the rotor, and one end of the shaft is coupled through bolt fastening or the like to the crank shaft of the internal combustion engine and the other end is coupled through bolt fastening or the like to the drive plate. The inner diameter of the rotor is set so as to have a predetermined interference relative to the outer diameter of the shaft, and the shaft is pressed into the rotor and is fixed in a tight fit state such that the rotor is sandwiched between the internal combustion engine and the transmission and is coupled therewith.

In the above-mentioned example of a conventional electric motor for a hybrid vehicle, because the rotor is fixed only through tight fitting of the coupling shaft pressed into the rotor, a high dimensional accuracy is needed for the inner diameter of the rotor and the outer diameter of the coupling shaft so as to secure a predetermined interference, thereby giving rise to a problem that the machining cost for producing the rotor and the shaft is increased.

Furthermore, because the rotor is positioned only through tight fitting of the coupling shaft pressed into the rotor, if the positional accuracy of the outer diameter of the rotor is deteriorated during, for example, pressing the coupling shaft or the like into the rotor, in an electric motor equipped with a stator opposed to the outer circumference of the rotor, the dimension accuracy of the gap between the rotor and the stator may be disadvantageously deteriorated.

DISCLOSURE OF THE INVENTION

The present invention has been made in view of the above circumstances, and it is an object thereof to provide an electric motor for a hybrid vehicle which prevents an excess increase in the cost of producing the rotor, and which enables securing a desired performance easily.

In order to solve the above problem, according to the present invention, there is provided an electric motor for a hybrid vehicle comprising: a rotor disposed and coupled between an internal combustion engine and a transmission, the rotor being coupled, at one end thereof in a direction of a rotation axis, to a crank shaft of the internal combustion engine and, at an opposite end, to the transmission via a drive plate; a through hole provided in the rotor so as to extend therethrough in the direction of the rotation axis; a fastening hole provided in an end face of the crank shaft and in the drive plate, each facing and being in communication with the through hole; and a fastening member inserted in the through hole and in each of the fastening holes such that the rotor is fixed between the crank shaft and the drive plate.

With the electric motor for a hybrid vehicle of the above construction, because the rotor and the crank shaft, and the rotor and the drive plate are respectively integrally fixed by the fastening member, and the power is transmitted through the fastening member, as compared for example with the case where the crank shaft and the drive plate are coupled via the coupling shaft or the like that is pressed into the rotor, it is possible to facilitate the adjustment of the rotation balance of the rotor, to reduce the weight of the power plant made up of the internal combustion engine and the transmission that sandwich the hybrid vehicle electric motor, and to reduce the cost of constructing the power plant.

Moreover, because the rotor is fixed sandwiched by the crank shaft and the drive plate from both sides in the direction of the rotation axis, it is possible, irrespective, for example, of the shape, working accuracy and the like of the inner and outer circumferential surfaces of the rotor, to dispose the crank shaft, the drive plate, and the rotor with high precision. Furthermore, after the rotor, the crank shaft, and the drive plate are coupled together, the dimensional accuracy of the outer and inner diameters of the rotor is unlikely to be degraded, and it is possible, in the electric motor equipped with the stator disposed in opposition to the outer or inner circumference of the rotor, to set the gap between the rotor and the stator with a high dimensional accuracy.

Preferably, the electric motor for a hybrid vehicle of the present invention, as mentioned above, further comprises a crank end plate mounted on the end face of the crank shaft, which projects, when mounted on the end face of the crank shaft, radially outwardly of an outer circumferential surface of the crank shaft, the crank end plate having a fastening hole that faces, and is in communication with, the through hole, and being inserted in the fastening hole of the crank end plate so as to fix the rotor and the drive plate to the crank end plate.

With the electric motor for a hybrid vehicle of the above construction, because the rotor and the crank end plate, and the rotor and the drive plate are respectively integrally fixed by the fastening member, and the power is transmitted through the fastening member, as compared, for example, with the case where the crank shaft and the drive plate are coupled via the coupling shaft or the like that is pressed into the rotor, it is possible to facilitate the adjustment of the rotation balance of the rotor, to reduce the weight of the power plant made up of the internal combustion engine and the transmission that sandwich the hybrid vehicle electric motor, and to reduce the cost needed to construct the power plant.

Moreover, because the rotor is fixed sandwiched by the crank end plate and the drive plate from both sides in the direction of the rotation axis, it is possible, irrespective, for example, of the shape, working accuracy, and the like of the inner and outer circumferential surfaces of the rotor, to dispose the crank shaft, the drive plate, and the rotor with high precision. Furthermore, after the rotor, the crank shaft, and the drive plate are coupled together, the dimensional accuracy of the outer and inner diameters of the rotor is unlikely to be degraded, and it is possible, in the electric motor equipped with the stator disposed in opposition to the outer or inner circumference of the rotor, to set the gap between the rotor and the stator with a high dimensional accuracy.

Preferably, in the above electric motor for a hybrid vehicle, the rotor is a rotor of a permanent magnet type comprising a plurality of permanent magnet pieces, and the permanent magnet pieces are sandwiched by the crank end plate and the drive plate from both sides in the direction of the rotation axis.

With the electric motor for a hybrid vehicle of the above construction, the permanent magnet pieces provided on the rotor can be prevented from slipping off in the direction parallel to the rotation axis of the rotor.

Preferably, the electric motor for a hybrid vehicle of the present invention as mentioned above further comprises an end plate provided between the crank shaft and the rotor, the end plate has a fastening hole that faces, and is in communication with, the through hole, and the fastening member is inserted in the fastening hole of the end plate so as to fix the end plate between the crank shaft and the rotor, and the rotor is a rotor of a permanent magnet type comprising a plurality of permanent magnet pieces, and the permanent magnet pieces abut at least against the drive plate so as to be restricted from movement in a direction parallel to the rotation axis.

With the electric motor for a hybrid vehicle of the above construction, the permanent magnet pieces provided on the rotor can be prevented from slipping off in the direction parallel to the rotation axis of the rotor.

Preferably, the electric motor for a hybrid vehicle of the present invention as mentioned above further comprises an end plate provided between the crank shaft and the rotor, the end plate has a fastening hole that faces, and is in communication with, the through hole, and the fastening member is inserted in the fastening hole of the end plate so as to fix the end plate between the crank shaft and the rotor, and the rotor is a rotor of a permanent magnet type comprising a plurality of permanent magnet pieces, the rotor includes a magnet holding plate mounted on the rotor independently of the drive plate, and the permanent magnet pieces abut against the magnet holding plate so as to be restricted from movement in a direction parallel to the rotation axis.

With the electric motor for a hybrid vehicle of the above construction, the permanent magnet pieces provided on the rotor can be prevented from slipping off in the direction parallel to the rotation axis of the rotor.

Preferably, in the electric motor for a hybrid vehicle as mentioned above, the rotor has a magnet mount portion on which the permanent magnet pieces are mounted and a fastening portion provided with the through hole, and the magnet mount portion and the fastening portion are connected in a radial direction of the rotor by a plurality of ribs, and a lightening portion is provided between neighboring ribs of the plurality of ribs that extends through the rotor.

With the electric motor for a hybrid vehicle of the above construction, in the case where, for example, the stator is disposed in opposition to the outer circumferential portion of the rotor and thus the magnet mount portion for mounting the permanent magnet pieces thereon is located at the outer circumferential portion of the rotor, in order to suppress an excess increase in the diameter dimension of the crank shaft having the fastening hole that communicates with the through hole of the rotor, the fastening portion with the through hole is provided at the inner circumferential portion of the rotor. In this rotor, by the plurality of ribs that connect the magnet mount portion and the fastening portion, and the lightening portion provided between neighboring ribs that passes through the rotor, a desired strength may be secured while preventing an excess increase in the weight of the rotor.

In the case where, for example, the magnet mount portion and the fastening portion are located at an outer circumferential portion of the rotor, the inner circumferential portion of the rotor is made into a simple hole by stamping or the like, resulting in an increase in the diameter dimension of the crank shaft provided with the fastening hole that communicates with the through hole of the rotor. In contrast, in the present invention, an increase in the diameter dimension of the crank shaft is suppressed, while effectively utilizing the inner circumferential portion of the rotor as ribs or a fastening portion which would otherwise simply be stamped out.

Preferably, in the electric motor for a hybrid vehicle as mentioned above, the rotor has a stack of a plurality of electromagnetic steel plates that constitute a magnetic circuit, and a crimp portion that crimps the stack of the plurality of electromagnetic steel plates between the magnet mount portion and the lightening portion.

With the electric motor for a hybrid vehicle of the above construction, without the necessity of providing, for example, a dedicated fixation member or the like, the stack of the plurality of electromagnetic steel plates is firmly fixed, thereby preventing scattering or the like of the electromagnetic steel plates. Moreover, a positional deviation of the electromagnetic steel plates may be prevented from taking place in the plane intersecting with the rotation axis of the rotor core.

Preferably, in the electric motor for a hybrid vehicle as mentioned above, the rotor has a stack of electromagnetic steel plates that constitute a magnetic circuit, and a crimp portion that crimps the stack of the electromagnetic steel plates on a periphery of the through hole.

With the electric motor for a hybrid vehicle of the above construction, without the necessity of providing, for example, a dedicated fixation member or the like, the stack of the plurality of electromagnetic steel plates is firmly fixed, thereby preventing scattering or the like of the electromagnetic steel plates. Moreover, by crimping on the periphery of the through hole of the rotor, i.e., in the vicinity to the point where the fastening member is inserted to fasten, a positional deviation of the electromagnetic steel plates may be prevented from taking place in the plane intersecting with the rotation axis of the rotor core, especially with the fastening by the fastening member.

BEST MODE FOR CARRYING OUT THE INVENTION

One embodiment of an electric motor for a hybrid vehicle of the present invention will now be described with reference to the attached drawings.

Figure 1:
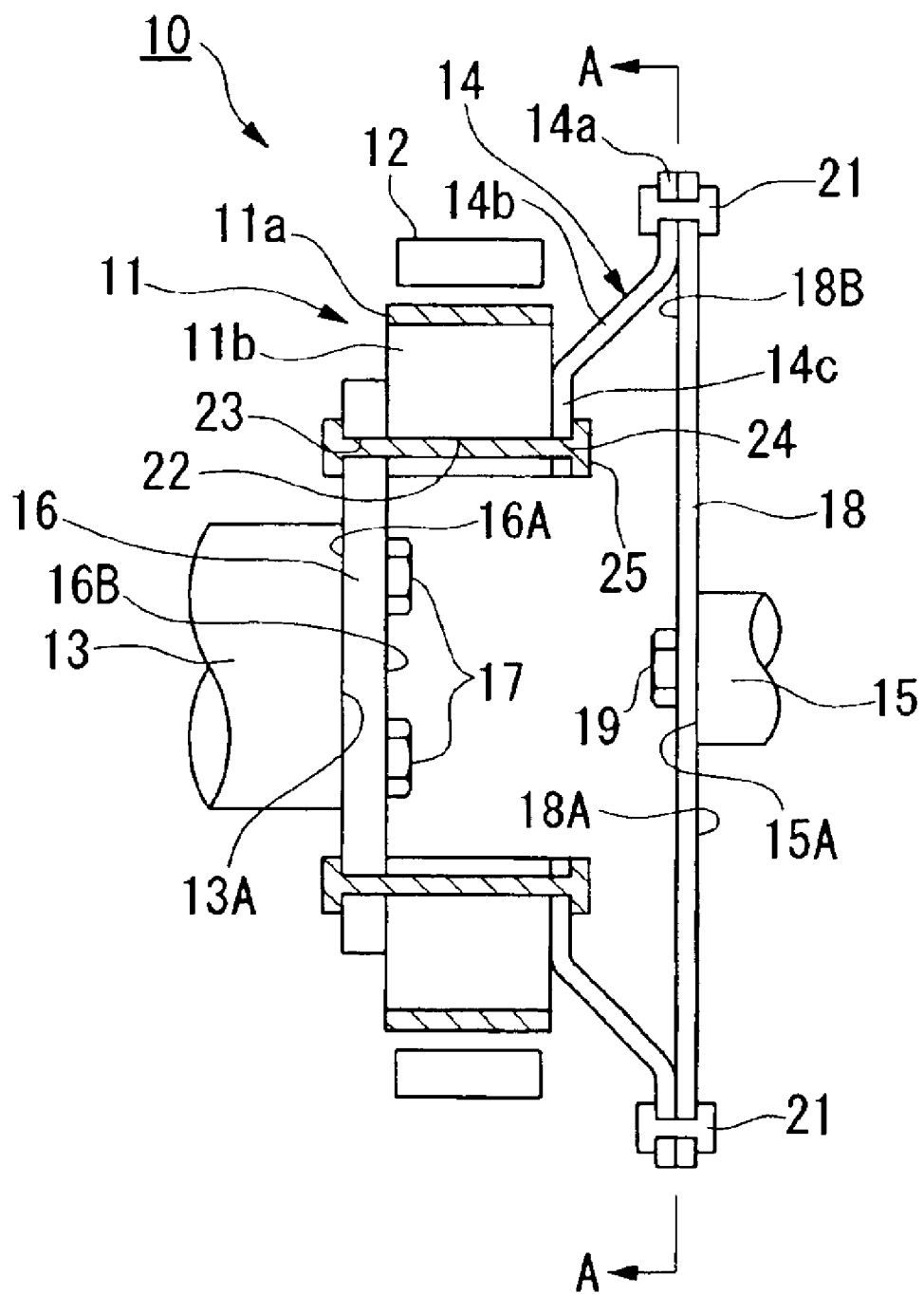
FIG. 1 is a cross sectional view of an electric motor for a hybrid vehicle according to an embodiment of the present invention, including a rotation axis thereof.

An electric motor 10 for a hybrid vehicle according to the present embodiment is a brushless DC motor and, as shown for example in FIG. 1, includes a rotor 11 having permanent magnets 11a, and a stator 12 having a plural phase stator winding (not shown) that generates the rotating magnetic field to rotate the rotor 11. One end of the rotor 11 in the direction of a rotation axis thereof is coupled to a crank shaft 13 of the internal combustion engine (not shown), and the other end is coupled via a drive plate 14 to an input shaft 15 of the transmission (not shown) such that the drive force of either one of the internal combustion engine and the electric motor 10 for a hybrid vehicle directly coupled in series is transmitted via the transmission to vehicle drive wheels (not shown).

Furthermore, if a drive force is transmitted from the drive wheels to the electric motor 10 for a hybrid vehicle during deceleration of the vehicle, the hybrid vehicle electric motor 10 functions as a generator and produces a regenerative braking force such that the kinetic energy of the vehicle body is recovered as electric energy (regenerative energy). In addition, if the output of the internal combustion engine is transmitted to the electric motor 10 for a hybrid vehicle, the hybrid vehicle electric motor 10 functions as a generator and produces electric energy.

The rotor 11 includes a substantially cylindrical rotor core 11b made up of a stack of electromagnetic steel plates such as, for example, silicon steel plates, and permanent magnets 11a disposed on the outer circumferential surface of the rotor core 11b at a predetermined spacing in the circumferential direction, the permanent magnets 11a having substantially a plate-like shape extending in the direction of the rotation axis. The outer circumferential surface of the permanent magnets 11a, as shown for example in FIG. 2, is exposed to the inner circumferential surface of a substantially cylindrical stator 12 disposed in opposition to the outer circumference of the rotor 11.

One surface 16A of a substantially disk-like crank end plate 16, which has a greater outer diameter than the outer circumferential surface of the crank shaft 13, is face-contacted with an end face 13A of the crank shaft 13 of the internal combustion engine. The crank shaft 13 and the crank end plate 16 are fixed together with a plurality of fastening bolts 17, . . . , 17, with their rotation axes disposed coaxially.

One surface 18A of a substantially disk-like input shaft end plate 18, which has a greater outer diameter than the outer circumferential surface of the input shaft 15, is face-contacted with an end face 15A of the input shaft 15 of the transmission. The input shaft 15 and the input shaft end plate 18 are fixed together with a plurality of fastening bolts 19, . . . , 19, with their rotation axes disposed coaxially.

Figure 2:
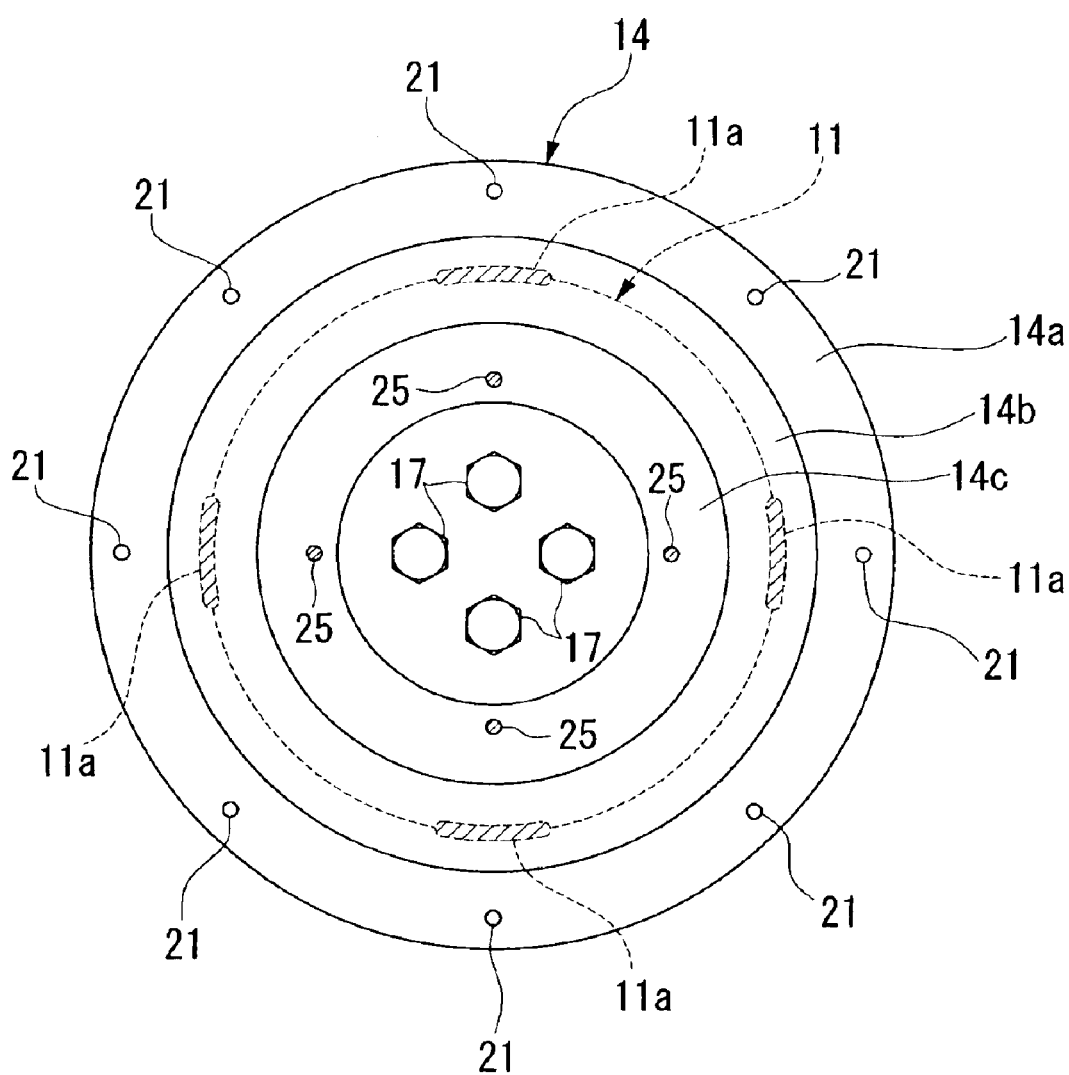
FIG. 2 is a view of a drive plate shown in FIG. 1, taken along the line A—A and seen as indicated by an arrow.

The drive plate 14 has substantially a multi-cylindrical shape and, as shown for example in FIG. 2, includes an outer circumferential portion 14a which is coupled to the input shaft end plate 18 of the transmission, and an inner circumferential portion 14c which projects in the direction of the rotation axis from the outer circumferential portion 14a via a bent portion 14b toward the crank shaft 13 of the internal combustion engine.

Here, a surface of the outer circumferential portion 14a of the drive plate 14 is face-contacted with the other surface 18B of the input shaft end plate 18 at an outer circumferential portion thereof and is fixed to the input shaft end plate 18 through, for example, a rivet 21.

The rotor core 11b, at one end face thereof in the direction of the rotation axis of the rotor 11, is in face contact with the other surface 16B of the crank end plate 16 at its outer circumferential portion projecting radially outwardly of the outer circumferential surface of the crank shaft 13, and at the other end face is in face contact with a surface of the drive plate 14 at the inner circumferential portion 14, such that the rotor core 11b is sandwiched from both sides by the crank end plate 16 and the inner circumferential portion 14c of the drive plate 14.

The rotor core 11b is provided, at a predetermined spacing in the circumferential direction, with a plurality of through holes 22, . . . , 22 that pass through the rotor core 11b in the direction of the rotation axis, and the crank end plate 16 and the inner circumferential portion 14c of the drive plate 14 are provided with respective fastening holes 23 and 24 that face the through holes 22 of the rotor core 11b to be in communication therewith.

A fastening member 25 such as for example a rivet or bolt is inserted in the through hole 22 of the rotor core 11b, the fastening hole 23 of the crank end plate 16, and the fastening hole 24 of the inner circumferential portion 14c of the drive plate 14 to fix together the rotor core 11b, the crank end plate 16, and the drive plate 14.

As mentioned above, according to the electric motor 10 for a hybrid vehicle of the present embodiment, because the rotor core 11b, the crank end plate 16, and the drive plate 14 are fixed integrally together by the fastening members 25 and the power is transmitted through the fastening members 25, as compared, for example, with the case where the crank shaft 13 and the drive plate 14 are coupled via the coupling shaft or the like that is pressed into the rotor core 11b, it is possible to facilitate the adjustment of the rotation balance of the rotor core 11b, to reduce the weight of the power plant consisting of the internal combustion engine and the transmission that sandwich the hybrid vehicle electric motor 10, and to reduce the cost for constructing the power plant.

Moreover, because the rotor core 11b is fixed sandwiched by the crank end plate 16 and the drive plate 14 from both sides in the direction of the rotation axis, it is possible, irrespective, for example, of the shape, working accuracy, and the like of the inner circumferential surface of the rotor core 11b, to coaxially dispose the crank shaft 13, the drive plate 14, and the rotor core 11b with high precision.

Furthermore, after the rotor core 11b, the crank shaft 13, and the drive plate 14 are coupled together, the dimension accuracy of the outer diameter of the rotor core 11b is unlikely to be degraded, and it is possible to set the gap between the outer circumferential portion of the rotor 11 and the stator 12 disposed in opposition thereto with a high dimension accuracy.

Figure 3:
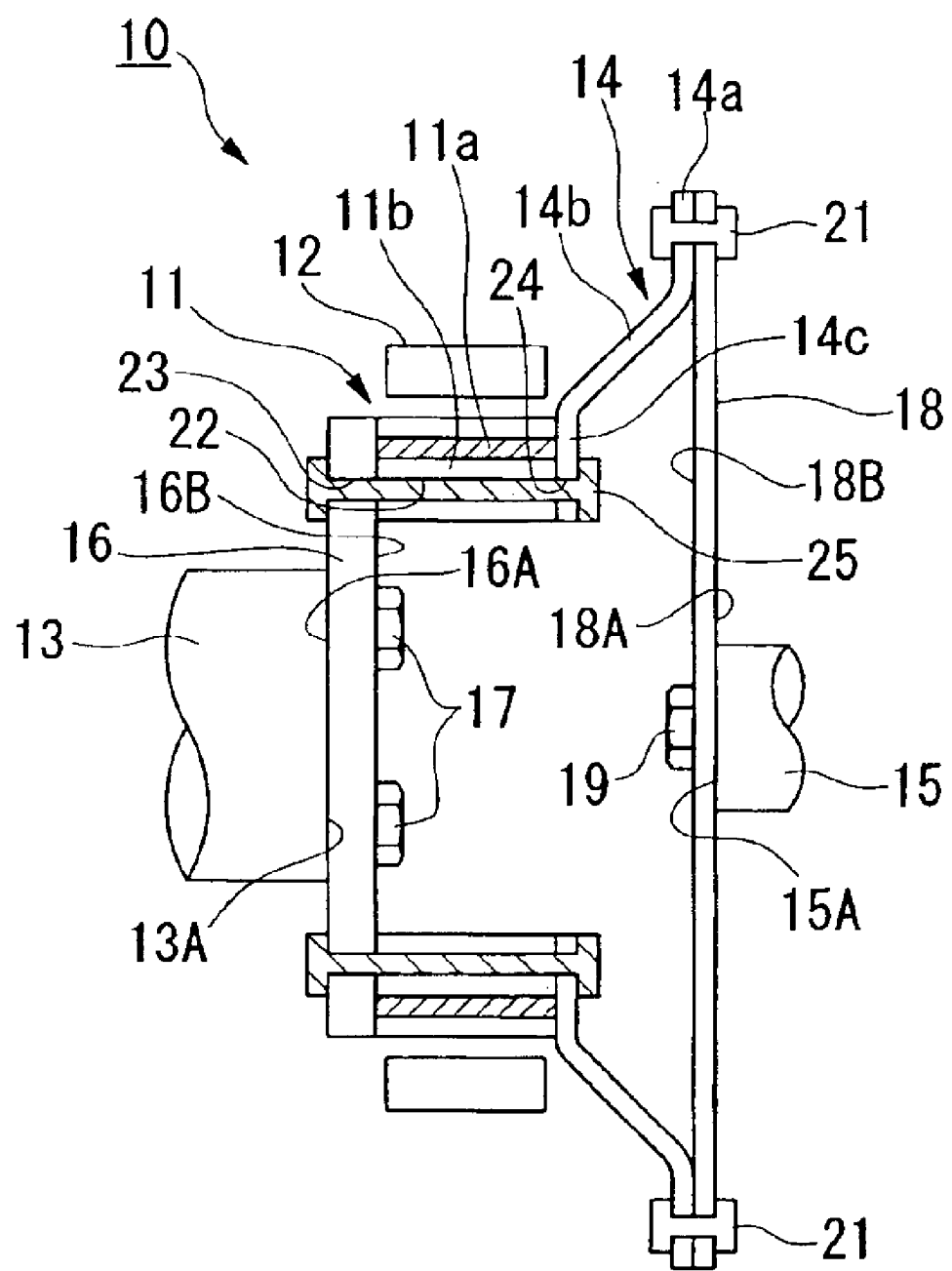
FIG. 3 is a cross sectional view of an electric motor for a hybrid vehicle according to a first variant example of the present embodiment, including a rotation axis thereof.

Note that, although it has been shown in the present embodiment as described above that the rotor core 11b of the rotor 11 is sandwiched from both sides by the crank end plate 16 and the inner circumferential portion 14c of the drive plate 14, this is not so limited, and as in the electric motor 10 for a hybrid vehicle according to the first variant example of the present embodiment as shown in FIG. 3, it may be constructed such that the rotor core 11b and the permanent magnet 11a provided in the rotor 11 are sandwiched from both sides by the crank end plate 16 and the inner circumferential portion 14c of the drive plate 14.

In this case, the permanent magnet 11a may be prevented from slipping off from the rotor 11 in the direction of the rotation axis.

Figure 4:
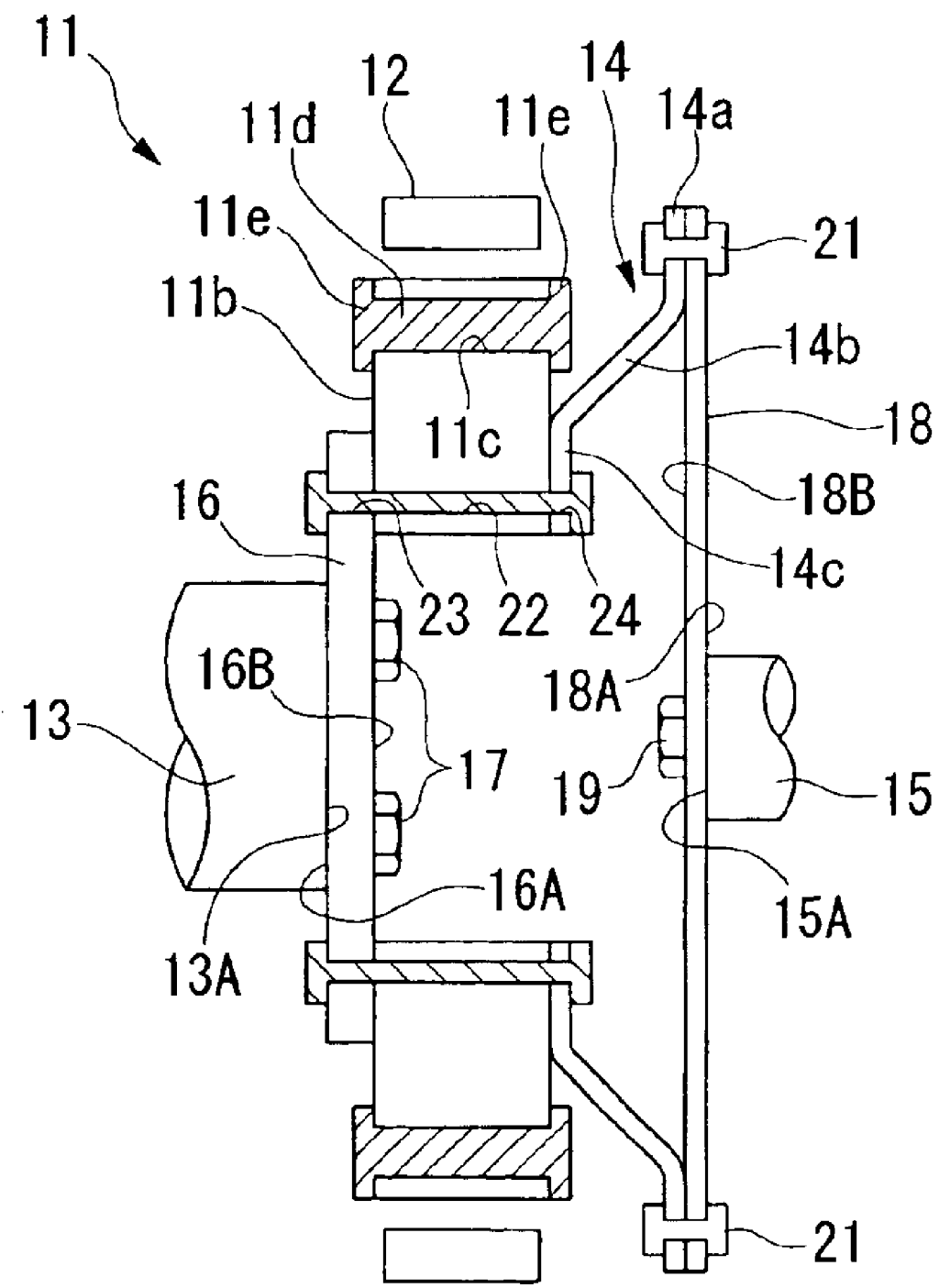
FIG. 4 is a cross sectional view of an electric motor for a hybrid vehicle according to a second variant example of the present embodiment, including a rotation axis thereof.

In addition, although in the present embodiment as described above the electric motor 10 for a hybrid vehicle has been shown to be a brushless DC motor, this is not so limited, and like the hybrid vehicle electric motor 10 according to the second variant example of the present embodiment as shown in FIG. 4, it may for example be an induction motor of a cage type or the like.

The electric motor 10 for a hybrid vehicle according to the second variant example of the present embodiment includes, for example, a cage rotor 11 which includes a substantially cylindrical rotor core 11b made up of a stack of electromagnetic steel plates such as silicon steel plates, a plurality of slots 11c, . . . , 11c disposed on the outer circumferential surface of the rotor core 11b at a predetermined spacing in the circumferential direction and extending radially inwardly, rotor conductors 11d, . . . , 11d provided inside the respective slots 11c, . . . , 11c, and substantially annular end rings 11e and 11e formed integrally with each rotor 11d, . . . , 11d and covering both sides of the outer circumferential portion of the rotor core 11b in a sandwiched manner.

Here, the rotor conductor 11d is, for example, an aluminum conductor formed by a casting method such as die casting in which the shaping is effected by pressing molten metal such as aluminum or an aluminum alloy into the slot 11c internally provided with an insulating layer, and is shaped integrally with the end rings 11e and 11e formed from the same conductor material.

The inner circumferential portion of the rotor core 11b is provided, at a predetermined spacing in the circumferential direction, with a plurality of through holes 22, . . . , 22 that pass therethrough in the direction of the rotation axis, and a fastening member 25 such as for example a rivet or bolt is inserted in the through holes 22, as well as in the fastening holes 23 of the crank end plate 16 and the fastening holes 24 at the inner circumferential portion 14c of the drive plate 14 that face, and are in communication with, the through holes 22, so as to fix the rotor core 11b, the crank end plate 16, and the drive plate 14 together.

Figure 5:
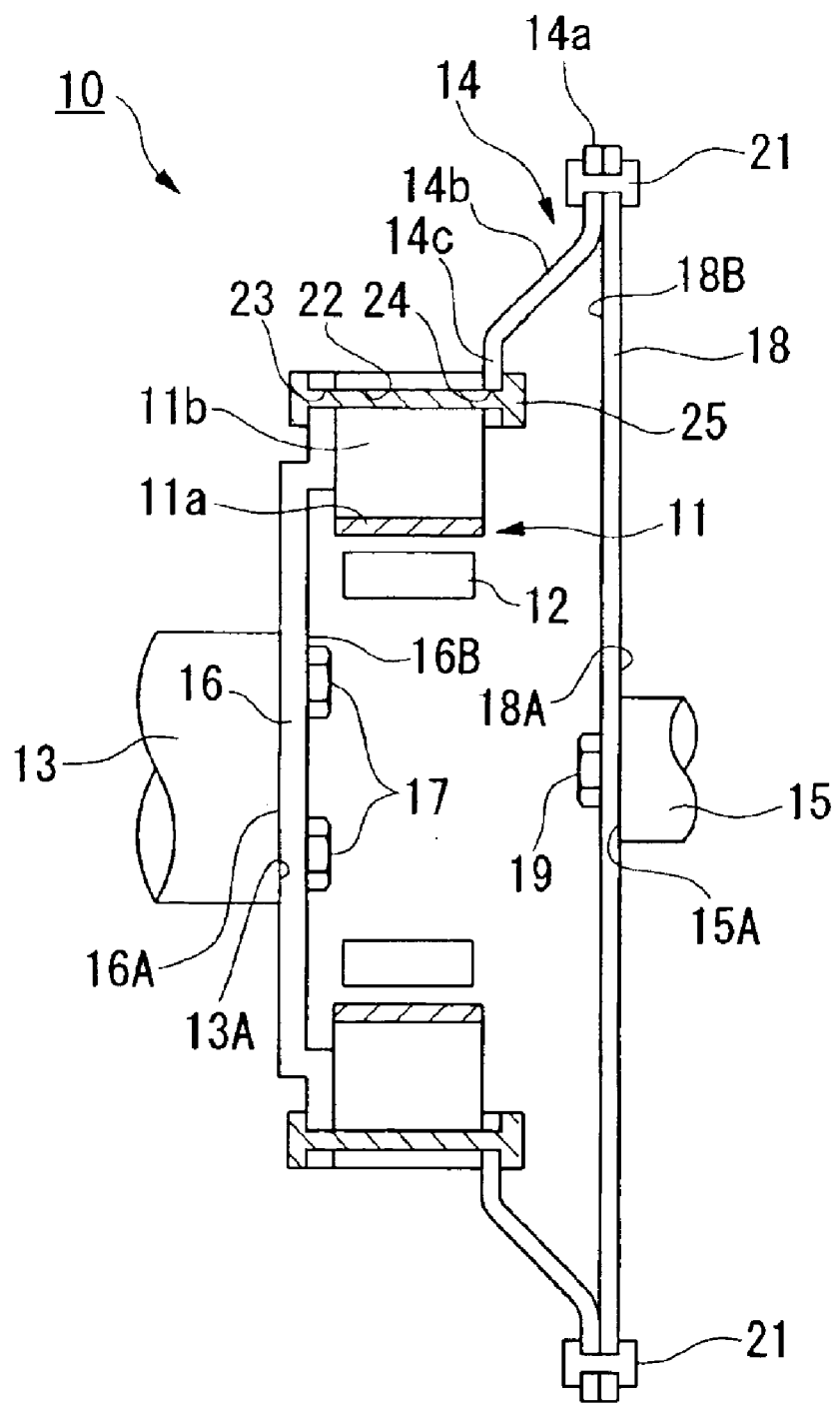
FIG. 5 is a cross sectional view of an electric motor for a hybrid vehicle according to a third variant example of the present embodiment, including a rotation axis thereof.
Figure 6:
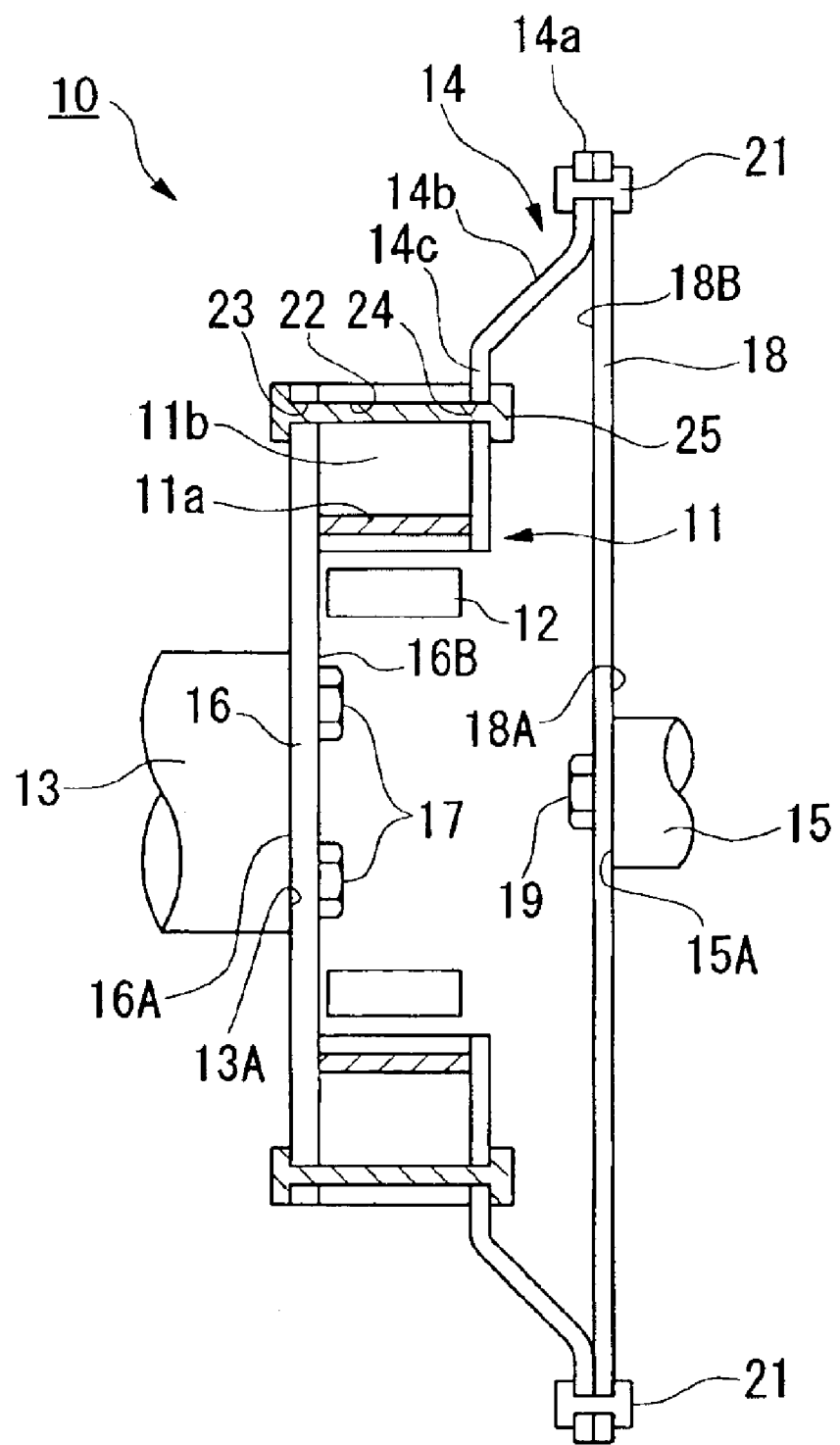
FIG. 6 is a cross sectional view of an electric motor for a hybrid vehicle according to a fourth variant example of the present embodiment, including a rotation axis thereof.
Figure 7:
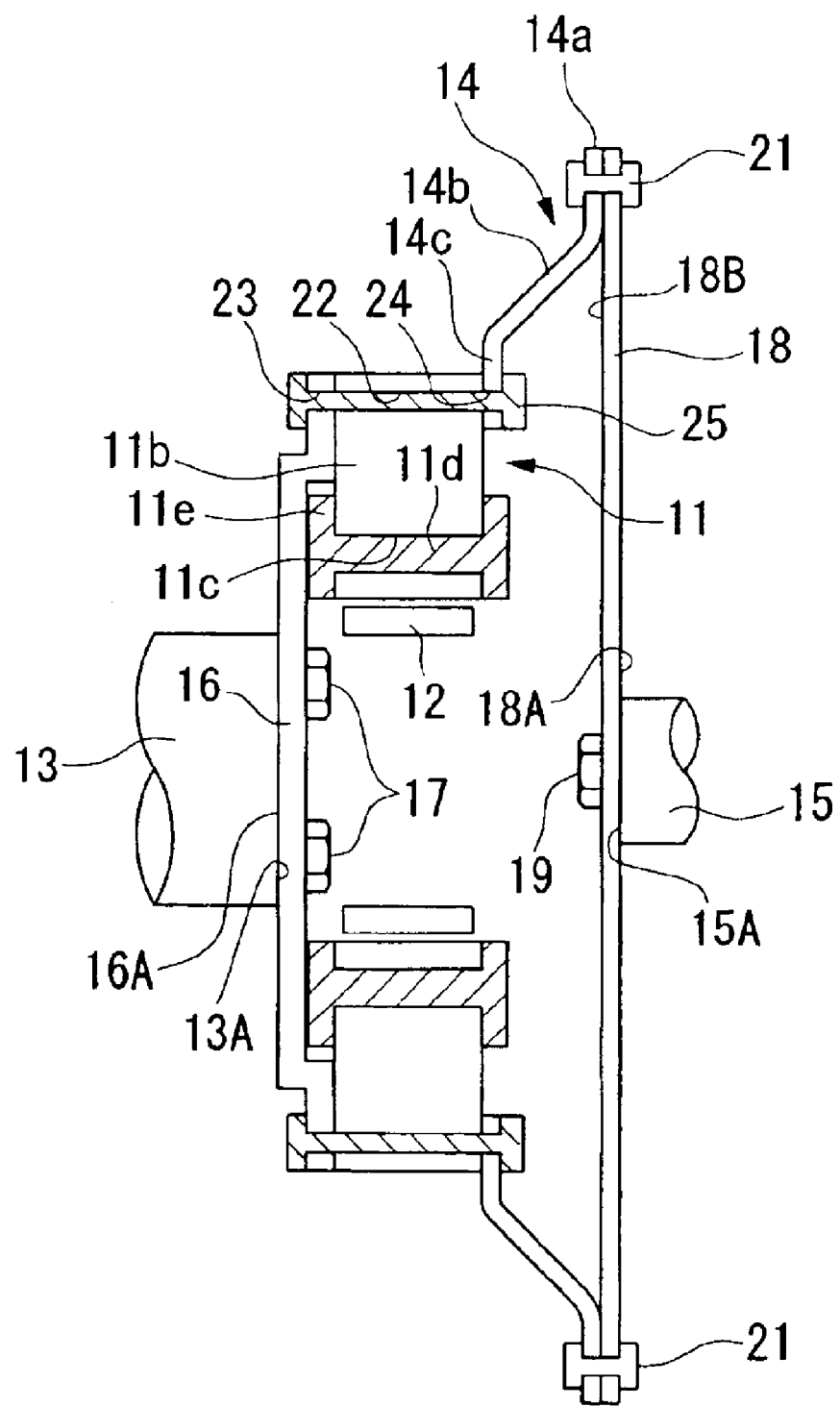
FIG. 7 is a cross sectional view of an electric motor for a hybrid vehicle according to a fifth variant example of the present embodiment, including a rotation axis thereof.
Figure 8:
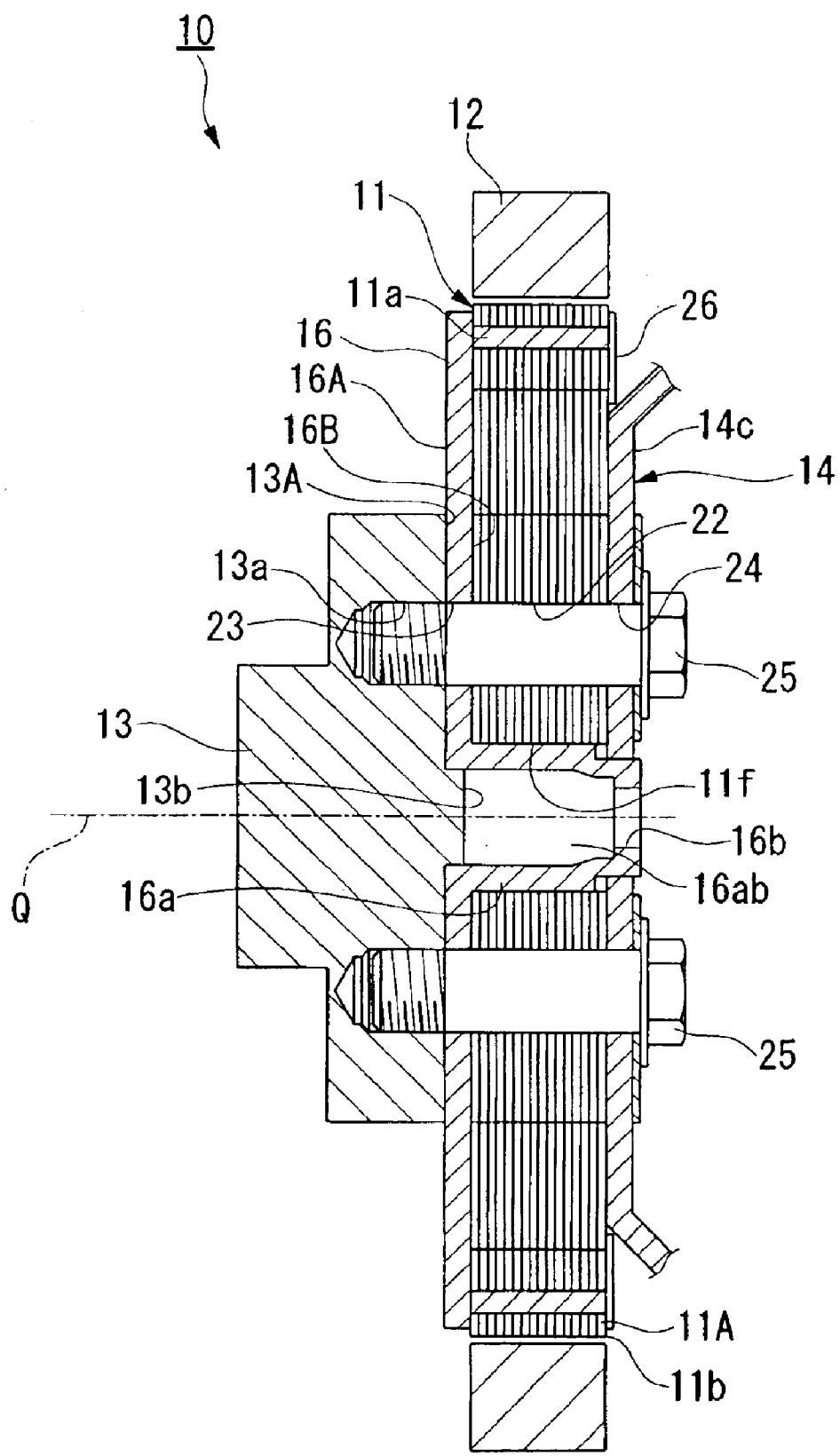
FIG. 8 is a cross sectional view of an electric motor for a hybrid vehicle according to a sixth variant example of the present embodiment, including a rotation axis thereof.

Although, in the above-described present embodiment and the first and second variant examples of the present embodiment, the rotor 11 has been shown to be disposed in opposition to the substantially cylindrical inner circumferential portion of the stator 12, this is not limiting, and as in the electric motor 10 for a hybrid vehicle according to the third to fifth variant examples of the present embodiment as shown in FIGS. 5 to 7, the rotor 11 may be disposed in opposition to the substantially cylindrical outer circumferential portion of the stator 12.

In these third to fifth variant examples, the outer circumferential portion of the rotor core 11b is provided, at a predetermined spacing in the circumferential direction, with a plurality of through holes 22, . . . , 22 that pass therethrough in the direction of the rotation axis, and a fastening member 25 such as for example a rivet or bolt is inserted in the through holes 22, as well as in the fastening holes 23 of the crank end plate 16 and the fastening holes 24 at the inner circumferential portion 14c of the drive plate 14 that face, and are in communication with, the through holes 22, so as to fix the rotor core 11b, the crank end plate 16, and the drive plate 14 together.

An electric motor 10 for a hybrid vehicle according to the sixth variant example of the above-described present embodiment will now be described with reference to FIGS. 8 to 11.

Figure 9:
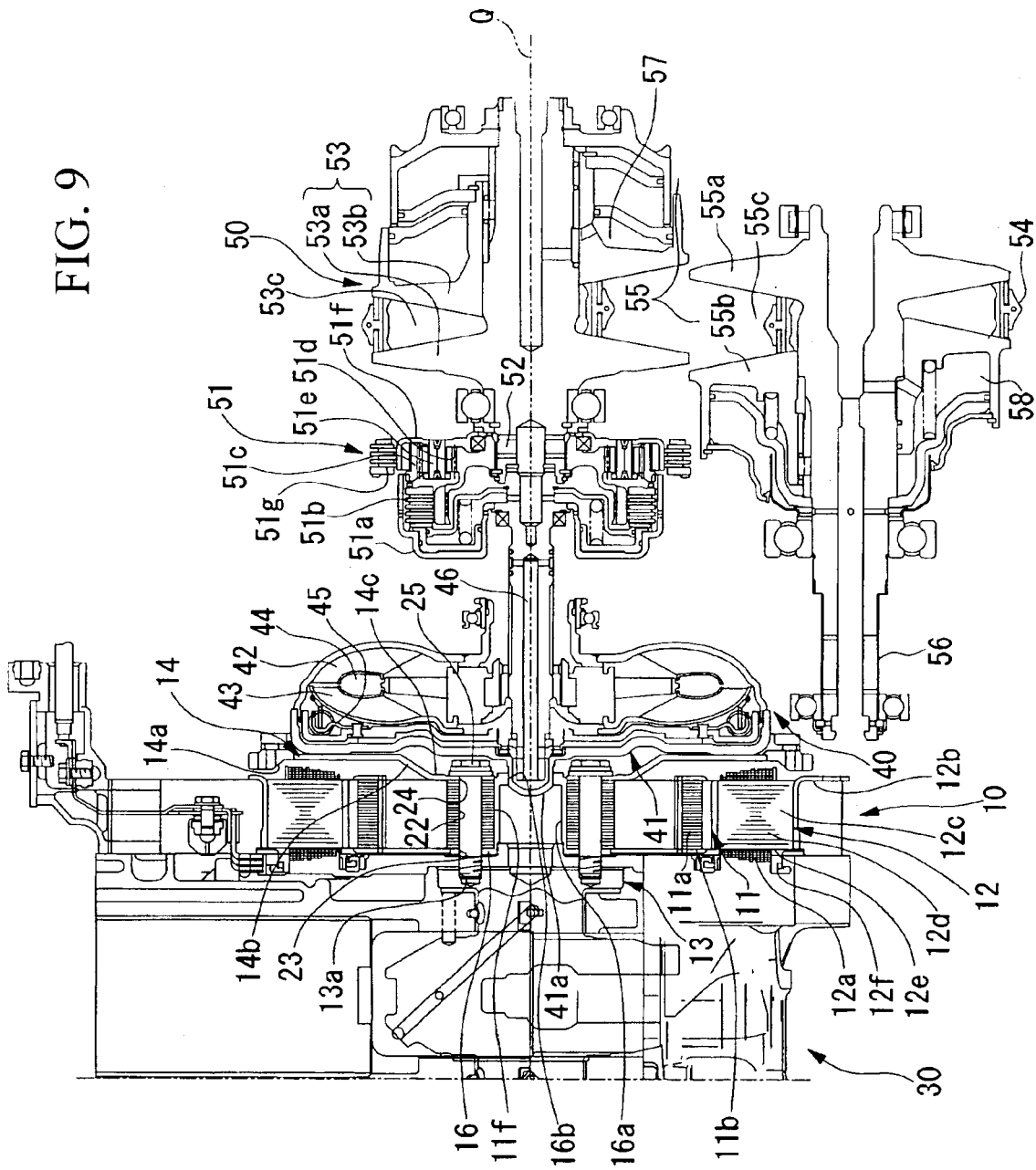
FIG. 9 is a structural view of a power transmission device of a vehicle with the electric motor for a hybrid vehicle as shown in FIG. 8 on board.

The electric motor 10 for a hybrid vehicle according to the sixth variant example is a brushless DC motor and, as shown in FIG. 9, includes a rotor 11 having permanent magnets 11a, and a stator 12 having a plural phase stator winding 12a that generates the rotating magnetic field to rotate the rotor 11. A fastening member 25 such as for example a rivet or bolt is fitted in succession in the fastening holes 24 at the inner circumferential portion 14c of the drive plate 14, the through holes 22 of the rotor core 11b, and the fastening holes 23 of the crank end plate 16, and further in fastening holes 13a provided in the crank shaft 13 of the internal combustion engine 30. Stated differently, a major point of the sixth variant example that differs from the above-described embodiment is that the fastening bolts 17 with which to fix the crank shaft 13 and the crank end plate 16 together are omitted, and that the fastening members fix the drive plate 14, the rotor core 11b, the crank end plate 16, and the crank shaft 13 together.

Figure 10:
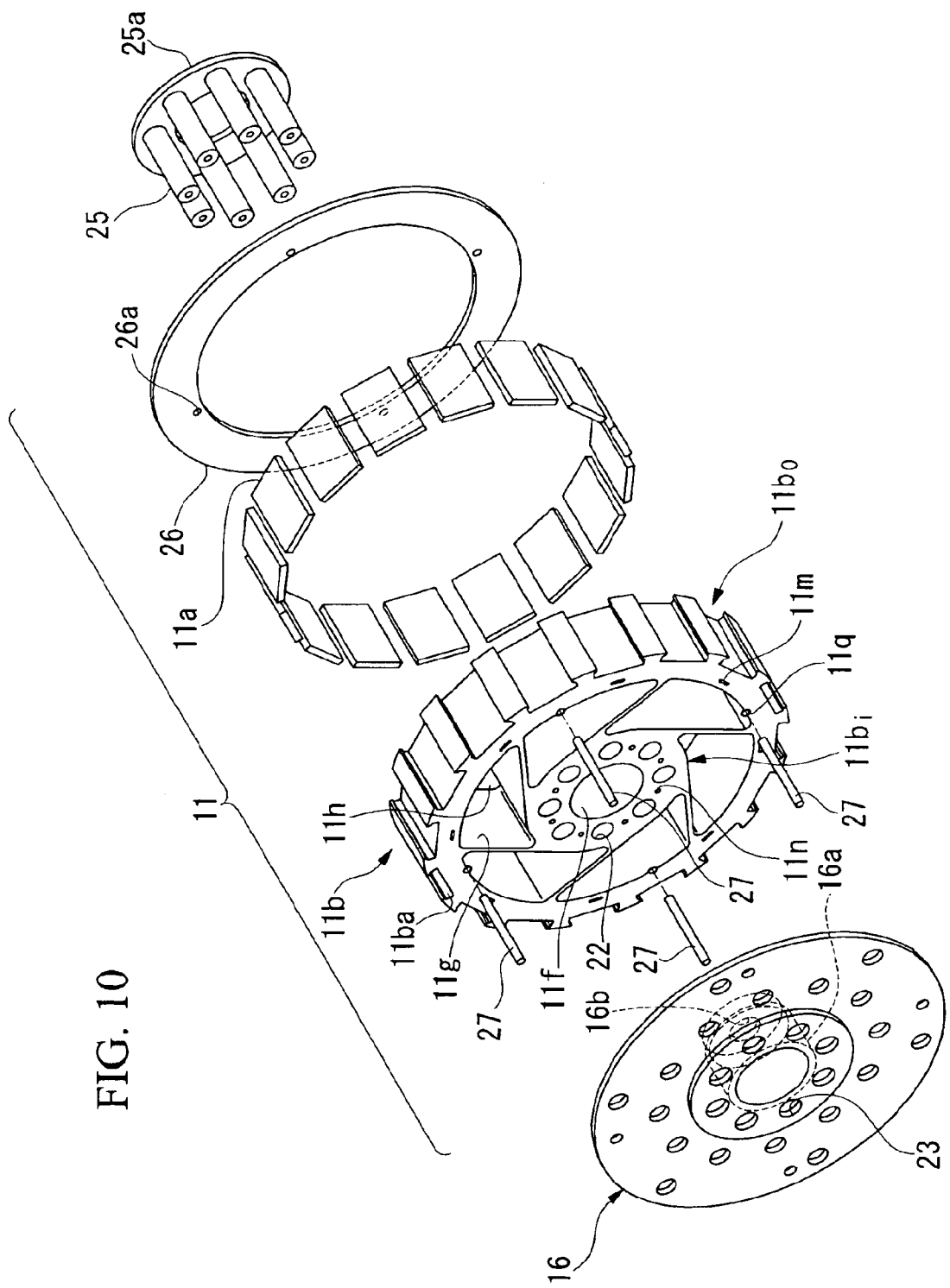
FIG. 10 is an exploded perspective view of a crank end plate and a rotor as shown in FIG. 8.
Figure 11:
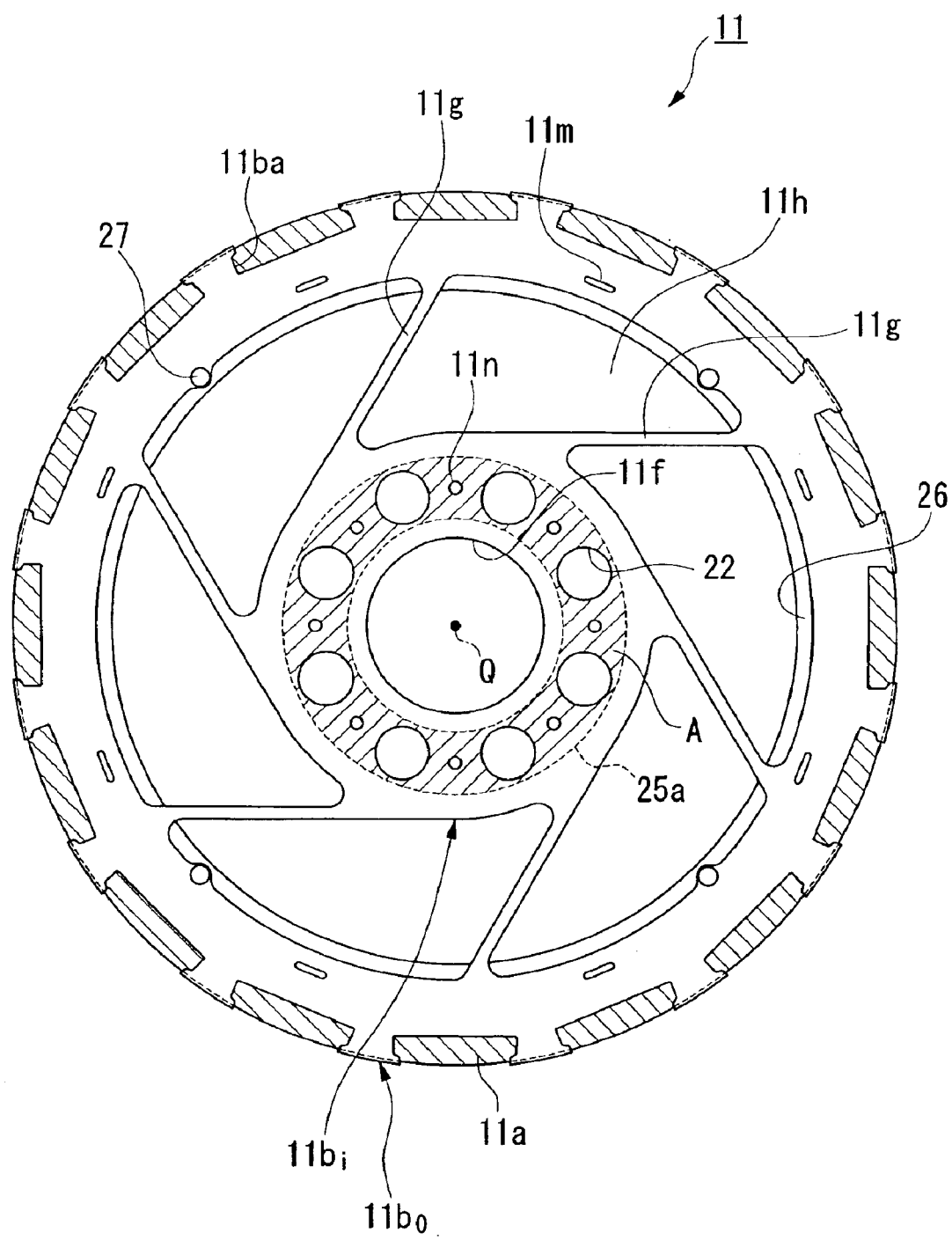
FIG. 11 is a plan view of the rotor as shown in FIG. 8.

The rotor 11, as shown for example in FIGS. 10 and 11, includes a substantially cylindrical rotor core 11b made up of a stack of electromagnetic steel plates such as for example silicon steel plates, permanent magnets 11a disposed on the outer circumferential portion of the rotor core 11b at a predetermined spacing in the circumferential direction, and an annular-plate-like end ring 26 having an outer diameter slightly smaller than the outer diameter of the rotor core 11b.

The outer circumferential portion of the rotor core 11b is a magnet mount portion 11bo which is formed with magnet mount holes 11ba that extend through in parallel to a rotation axis Q and open at the outer circumferential surface of the rotor core 11b. A permanent magnet 11a, which is, for example, substantially of plate-like shape, is mounted in the magnet mount hole 11ba to extend in the direction of the rotation axis Q. Thus, at least a portion of the outer circumferential surface of the permanent magnets 11a mounted in the magnet mount holes 11ba is exposed to the inner circumferential surface of the substantially cylindrical stator 12 disposed in opposition to the outer circumferential portion of the rotor 11.

The inner circumferential portion of the rotor core 11b is a fastening portion 11bi in which is provided with a fitting hole 11f with a predetermined diameter that passes through coaxially with the rotation axis Q. The fastening portion 11bi is further provided, at positions not interfering with the fitting hole 11f and spaced radially by a predetermined distance from the rotation axis Q, with a plurality of through holes 22, 22 at a predetermined spacing in the circumferential direction that pass through in parallel to the rotation axis Q.

The magnet mount portion 11bo at the outer circumferential portion and the fastening portion 11bi at the inner circumferential portion of the rotor core 11b are connected by means of a plurality of ribs 11g, . . . , 11g (for example, six) that are inclined to form a predetermined angle (for example; 45°) relative to the radial direction of the rotor core 11b, and a lightening portion 11h is provided between circumferentially neighboring ribs 11g and 11g that passes through the rotor core 11b in parallel to the rotation axis Q.

The plurality of electromagnetic steel plates 11A, . . . , 11A that constitute the rotor core 11b are fixed in position by, for example, crimping. The magnet mount portion 11bo at the outer circumferential portion of the rotor core 11b is provided with a plurality of first crimp portions 11m, . . . , 11m at positions shifted toward the inner circumference by a predetermined distance from the magnet mount holes 11ba and circumferentially spaced by a predetermined spacing. In addition, the fastening portion 11bi at the inner circumferential portion of the rotor core 11b is provided with a plurality of second crimp portions 11n, . . . , 11n at positions in the vicinity and on the periphery of the plurality of through holes 22, . . . , 22 that do not interfere with these through holes 22, . . . , 22, and that are circumferentially spaced by a predetermined spacing. Here, the positions in the vicinity of the plurality of through holes 22, . . . , 22 are for example positions within a region against which abuts the bearing surface of the fastening members 25 such as rivets or bolts that are fitted in the through holes 22 or a washer 25a carrying the fastening members 25 (for example, the region A as shown in FIG. 11 against which the washer 25a abuts).

Each electromagnetic steel plate 11A is provided on one surface thereof with, for example, crimp projections and on the other surface with crimp recesses at positions corresponding to the crimp portions 11m and 11n such that between the electromagnetic steel plates 11A and 11A to be stacked the crimp projections are fitted in the crimp recesses.

In addition, the inner circumferential portion of the magnet mount portion 11bo of the rotor core 11b is formed, at positions, for example, shifted more inwardly than the first crimp portions 11m and circumferentially spaced by a predetermined spacing, with a plurality of pin mount holes 11q, . . . , 11q that pass through in parallel to the rotation axis Q.

The annular-plate-like end ring 26 has an outer diameter slightly smaller than the outer diameter of the rotor core 11b and an inner diameter smaller than the inner circumferential surface of the magnet mount portion 11bo at the outer circumferential portion of the rotor core 11b such that it abuts against the end face of the permanent magnets 11a mounted on the magnet mount portion 11bo of the rotor core 11b. The end ring 26 is provided with mount holes 26a that face, and are in communication with, the respective pin mount holes 11q at the magnet mount portion 11bo of the rotor core 11b. Pins 27 are inserted into the respective pin mount holes 11q at the magnet mount portion 11bo of the rotor core and the mount holes 26a of the end ring 26 and are fixed through crimping or the like, so as to fix the rotor core 11b and the end ring 26 integrally together.

The stator 12 is formed into a substantially annular shape to be disposed in opposition to the outer circumferential portion of the stator 11 and is fixed to the inner circumferential surface of a substantially cylindrical stator holding ring 12b fixed to a housing (not shown) of a later-described CVT 50. The stator 12 includes a core 12e made up of a stack of a plurality of electromagnetic steel plates, each having an annular-shaped back yoke 12c and teeth 12d extending radially inwardly from the back yoke 12c, and a stator winding 12a wound via a bobbin 12f around each tooth 12d.

One surface 16A of the substantially disk-like crank end plate 16, which has a larger outer diameter than the outer circumferential surface of the crank shaft 13, is face-contacted with the end face 13A of the crank shaft 13 of the internal combustion engine 30 such that the crank shaft 13 and the crank end plate 16 have their rotation axes disposed coaxially with each other. In addition, the other surface 16B of the crank end plate 16 is face-contacted with one end face of the rotor core 11b in the direction along the rotation axis Q.

The crank end plate 16 is provided with the fastening holes 23 that face, and are in communication with, the through holes 22 of the rotor core 11b, and the crank shaft 13 is provided with the fastening holes 13a that face, and are in communication with, the through holes 22 of the rotor core 11b and the fastening holes 23 of the crank end plate 16.

Furthermore, the crank end plate 16 is provided with a fitting projection 16a that fits in the fitting hole 11f of the fastening portion 11bi at the inner circumferential portion of the rotor core 11b. The fitting projection 16a is formed, for example, by a center portion of the crank end plate 16 that projects along the rotation axis Q toward the fitting hole 11f of the rotor core 11b. Here, the inner diameter of the fitting hole 11f of the rotor core 11b has a predetermined interference relative to the outer diameter of the fitting projection 16a of the crank end plate 16, and the fitting projection 16a is pressed into the fitting hole 11f to be fixed in a tight fit state.

In addition, the end face 13A of the crank shaft 13 is provided at a center portion thereof with a projection 13b that projects along the rotation axis Q, which projection 13b is adapted to fit in an inner wall portion 16ab of the fitting projection 16a of the crank end plate 16 that forms a recess when the crank end plate 16 is viewed along the rotation axis Q from the crank shaft 13 side.

Furthermore, as shown for example in FIG. 9, the fitting projection 16a of the crank end plate 16 is provided at the end thereof with an engagement hole 16b that passes through coaxially with the rotation axis Q and has a predetermined diameter. An engagement projection 41a provided on a front cover 41 of a torque converter 40 engages in the engagement hole 16b. The engagement projection 41a is formed, for example, by a center portion of the front cover 41 that projects along the rotation axis Q toward the fitting projection 16a of the crank end plate 16.

In other words, by the fitting of the fitting projection 16a of the crank end plate 16 in the fitting hole 11f of the rotor core 11b, the rotation axis of the crank end plate 16 and the rotation axis Q of the rotor core 11b are coaxially positioned, and further by the engagement of the engagement projection 41a of the front cover 41 of the torque converter 40 in the engagement hole 16b of the fitting projection 16a of the crank end plate 16, the rotation axis of the crank end plate 16 and the rotation axis of the front cover 41 of the torque converter 40 are coaxially positioned.

The drive plate 14 is formed substantially into a multi-cylindrical shape and, as shown for example in FIG. 9, includes an outer circumferential portion 14a that is coupled to an outer circumferential portion of the front cover 41 of the torque converter 40 by fastening members such as rivets or bolts (not shown), and an inner circumferential portion 14c that projects along the rotation axis Q toward the crank shaft 13 from the outer circumferential portion 14a via a bent portion 14b.

The drive plate 14 is provided, at the inner circumferential portion 14c, with fastening holes 24 that face, and are in communication with, the through holes 22 of the rotor core 11b, and the surface of the inner circumferential portion 14c is in face contact with the other end face of the rotor core 11b in the direction along the rotation axis Q.

A fastening member 25 such as for example a rivet or bolt is fitted in succession in the fastening holes 24 at the inner circumferential portion 14c of the drive plate 14, the through holes 22 of the rotor core 11b, and the fastening holes 23 of the crank end plate 16, and further in fastening holes 13a provided in the crank shaft 13 of the internal combustion engine 30. Thus, the rotor core 11b is sandwiched from both sides by the crank end plate 16 and the inner circumferential portion 14c of the drive plate 14 to be fixed to the crank shaft 13.

The crank shaft 13 and the torque converter 40 are rotatably supported, for example, on their respective shafts (not shown) via ball bearings or the like such that the rotor 11 coupled to the crank shaft 13 and the torque converter 40 is rotatable.

The torque converter 40 transmits torque through a fluid and includes the front cover 41 which engages in the engagement hole 16b of the fitting projection 16a of the crank end plate 16 and is connected to the drive plate 14 via fastening members (not shown), a pump impeller 42 integral with the front cover 41, a turbine impeller 43 disposed in opposition to the pump impeller 42 at between the front cover 41 and the pump impeller 42, and a stator 44 disposed between the pump impeller 42 and the turbine impeller 43.

Furthermore, there is provided a lock-up clutch 45 between the turbine impeller 43 and the front cover 41 that is pressed toward the inner surface of the front cover 41 in accordance with a control command inputted from a control device (not shown) so as to engage with the front cover 41.

A hydraulic fluid (ATF: Automatic Transmission Fluid) is sealed in a container formed by the front cover 41 and the pump impeller 42.

Here, if the pump impeller 42 rotates integrally with the front cover 41 in a state where the lock-up clutch 45 is disengaged, a helical flow of the hydraulic fluid is generated which acts on the turbine impeller 43 to generate a rotational drive force, and the torque is transmitted through the hydraulic fluid. In this instance, the torque to be transmitted may be increased by the action of the stator 44.

If the lock-up clutch 45 is set in an engagement state, the rotational drive force is directly transmitted from the front cover 41 to the turbine impeller 43, not through the hydraulic fluid.

Note that the engagement state of the lock-up clutch 45 is variable, and the rotational drive force that is transmitted from the front cover 41 to the turbine impeller 43 through the lock-up clutch 45 is arbitrarily variable.

An output shaft (tor-con shaft) 46 of the torque converter 40, which is integrally connected to the turbine impeller 43 and the lock-up clutch 45, is connected to an advance and reverse switching mechanism 51 of a planetary gear type of the CVT 50.

The advance and reverse switching mechanism 51 of a planetary gear type includes an input rotational portion 51a integrally connected with the tor-con shaft 46, an advance clutch 51b that connects the input rotational portion 51a and an input shaft 52 of the CVT 50, a ring gear 51c constructed integrally with the input rotational portion 51a, a plurality of planetary gears 51e that mesh with a sun gear 51d provided on the input shaft 52 and the ring gear 51c, a carrier 51f that rotatably supports the planetary gears 51e, and a reverse clutch 51g that engages an outer circumferential portion of the carrier 51f with the housing (not shown).

In the advance and reverse switching mechanism 51 of a planetary gear type, the input rotational portion 51a and the input shaft 52 are engaged by the advance clutch 51b such that the input rotational portion 51a and the input shaft 52 integrally rotate in the same direction around the rotation axis Q. In addition, by disconnecting the advance clutch 51b and engaging the carrier 51f and the housing (not shown) by means of the reverse clutch 51g, the carrier 51f is fixed, and the input shaft 52 is driven through the planetary gears 51e. In this instance, the input shaft 52 rotates reversely to the rotation of the input rotational portion 51a around the rotation axis Q so as to reverse the vehicle.

The CVT 50 includes a drive pulley 53 supported by the advance and reverse switching mechanism 51 of a planetary gear type and the input shaft 52, a driven pulley 55 that rotates followingly, via a metal belt 54, to the rotation of the drive pulley 53, and an output shaft 56 that transmits the rotation of the driven pulley 55 to an intermediate shaft (not shown) coupled to drive wheels. The metal belt 54 is constructed, for example, by two straps equipped with a plurality of press tops.

The drive pulley 53 is made up of a fixed pulley half 53a fixed to the input shaft 52, and a movable pulley half 53b slidable in the axial direction by the oil pressure that acts on a hydraulic fluid chamber 57 through control by the control device (not shown), and the groove width of a groove 53c of the drive pulley 53 is variable depending on the slid position of the movable pulley half 53b.

Likewise, the driven pulley 55 is made up of a fixed pulley half 55a fixed to the output shaft 56, and a movable pulley half 55b movable in the axial direction by the oil pressure that acts on a hydraulic fluid chamber 58 through control by the control device (not shown), and the groove width of a groove 55c of the driven pulley 55 is variable depending on the slid position of the movable pulley half 55b.

In other words, as the oil pressure of each hydraulic fluid chambers 57 and 58 changes, the width of each groove 53c and 55c changes continuously such that the ratio of diameters for the metal belt 54 to be wound, that is, the gear ratio changes continuously.

According to the sixth variant example, because the rotor core 11b, the crank shaft 13, and the drive plate 14 are fixed integrally together by the fastening members 25 and the power is transmitted through the fastening members 25, as compared for example with the case where the crank shaft 13 and the drive plate 14 are coupled via the coupling shaft or the like that is pressed into the rotor core 11b, it is possible to facilitate the adjustment of the rotation balance of the rotor core 11b, to save weight of the power plant consisting of the internal combustion-engine and the transmission that sandwich the hybrid vehicle electric motor 10, and to reduce the cost of constructing the power plant.

Moreover, because the rotor core 11b is fixed sandwiched by the crank end plate 16 and the drive plate 14 from both sides in the direction of the rotation axis, it is possible, irrespective for example of the shape, working accuracy and the like of the inner circumferential surface of the rotor core 11b, to coaxially dispose the crank shaft 13, the drive plate 14, and the rotor core 11b with high precision.

Furthermore, after the rotor core 11b, the crank shaft 13, and the drive plate 14 are coupled together, the dimensional accuracy of the outer diameter of the rotor core 11b is unlikely to be degraded, and it is possible to set the gap between the outer circumferential portion of the rotor 11 and the stator 12 disposed in opposition thereto with a high dimension accuracy.

Furthermore, the four components of the rotor 11, the crank end plate 16, the drive plate 14, and the crank shaft 13 may be fixed only by means of the fastening members 25, thus saving troublesome labor at the time of assembly and preventing an increase in the component count needed for the assembly.

Moreover, the crank end plate 16, the rotor 11, and the front cover 41 of the torque converter 40 may be easily positioned, thus saving troublesome labor in adjusting the rotation balance of the rotor 11 and the like.

Furthermore, by the provision of the lightening portions 11h between the plurality of ribs 11g, . . . , 11g that connect the magnet mount portion 11bo and the fastening portion 11bi, which lightening portions pass through the rotor core 11b, a desired strength may be secured while preventing an excess increase in the weight of the rotor 11.

In addition, by fixing, at each crimp portion 11m and 11n, the plurality of electromagnetic steel plates 11A, ..., 11A that constitute the rotor core 11b, a dedicated fixation member, for example, may be dispensed with to firmly fix the plurality of electromagnetic steel plates 11A, ..., 11A and prevent the electromagnetic steel plates 11A from being scattered. Moreover, by crimping at the second crimp portions 11n on the periphery of the through holes 22 of the rotor core 11b, i.e., in the vicinity to the points where the fastening members 25 are inserted to fasten, a positional deviation of the electromagnetic steel plates 11A, ..., 11A may be prevented from taking place in the plane intersecting with the rotation axis Q of the rotor core 11b, especially with the fastening by the fastening members 25.

While it has been shown in the sixth variant example as described above that each electromagnetic steel plate 11A is provided on one surface thereof with crimp projections and on the other surface with crimp recesses at positions corresponding to the crimp portions 11m and 11n whereat to fix the plurality of electromagnetic steel plates 11A, ..., 11A, and that the crimp projections fit in the crimp recesses between electromagnetic steel plates 11A and 11A to be stacked, this is not limiting, and the plurality of electromagnetic steel plates 11A, ..., 11A may also be fixed integrally by, for example, providing the plurality of electromagnetic steel plates 11A, ..., 11A with a pin mount hole that passes through in parallel to the rotation axis Q and fixing the pin mounted in the pin mount hole by crimping or the like.

What is claimed is:

1. An electric motor for a hybrid vehicle comprising:

a rotor disposed and coupled between an internal combustion engine and a transmission, said rotor being coupled, at one end thereof in a direction of a rotation axis, to a crank shaft of said internal combustion engine and, at an opposite end, to said transmission via a drive plate, said rotor comprising a plurality of electromagnetic steel plates held together face to face and each having a hole;

a through hole provided in said rotor so as to extend therethrough in the direction of the rotation axis, said through hole being provided by the holes of said electromagnetic steel plates when said electromagnetic steel plates are held together face to face;

a fastening hole provided in an end face of said crank shaft and in said drive plate, each facing and being in communication with said through hole; and a fastening member inserted in said through hole and in each of said fastening holes such that said rotor is fixed between said crank shaft and said drive plate.

2. The electric motor for a hybrid vehicle according to claim 1, further comprising a crank end plate mounted on said end face of the crank shaft, which projects, when mounted on said end face of the crank shaft, radially outwardly of an outer circumferential surface of said crank shaft, said crank end plate having a fastening hole that faces, and is in communication with said through hole, and said fastening member being inserted in said fastening hole of said crank end plate so as to fix said rotor and said drive plate to said crank end plate.

3. The electric motor for a hybrid vehicle according to claim 2, wherein said rotor is a rotor of a permanent magnet type comprising a plurality of permanent magnet pieces, and wherein said permanent magnet pieces are sandwiched by said crank end plate and said drive plate from both sides in the direction of the rotation axis.

4. An electric motor for a hybrid vehicle comprising:

a rotor disposed and coupled between an internal combustion engine and a transmission, said rotor being coupled, at one end thereof in a direction of a rotation axis, to a crank shaft of said internal combustion engine and, at an opposite end, to said transmission via a drive plate;

a through hole provided in said rotor so as to extend therethrough in the direction of the rotation axis;

a fastening hole provided in an end face of said crank shaft and in said drive plate, each facing and being in communication with said through hole; and a fastening member inserted in said through hole and in each of said fastening holes such that said rotor is fixed between said crank shaft and said drive plate; and an end plate provided between said crank shaft and said rotor, wherein said end plate has a fastening hole that faces, and is in communication with, said through hole, and said fastening member is inserted in said fastening hole of said end plate so as to fix said end plate between said crank shaft and said rotor, and wherein said rotor is a rotor of a permanent magnet type comprising a plurality of permanent magnet pieces, and said permanent magnet pieces abut at least against said drive plate so as to be restricted from movement in a direction parallel to said rotation axis.

5. The electric motor for a hybrid vehicle according to claim 1, further comprising an end plate provided between said crank shaft and said rotor, wherein said end plate has a fastening hole that faces, and is in communication with, said through hole, and said fastening member is inserted in said fastening hole of said end plate so as to fix said end plate between said crank shaft and said rotor, and wherein said rotor is a rotor of a permanent magnet type comprising a plurality of permanent magnet pieces, said rotor includes a magnet holding plate mounted on said rotor independently of said drive plate, and said permanent magnet pieces abut against said magnet holding plate so as to be restricted from movement in a direction parallel to said rotation axis.

6. The electric motor for a hybrid vehicle according to claim 4 or 5, wherein said rotor has a magnet mount portion on which said permanent magnet pieces are mounted and a fastening portion provided with said through hole, and wherein said magnet mount portion and said fastening portion are connected in a radial direction of said rotor by a plurality of ribs, and a lightening portion is provided between neighboring ribs of said plurality of ribs that extends through said rotor.

7. The electric motor for a hybrid vehicle according to claim 6, wherein said rotor has a stack of a plurality of electromagnetic steel plates that constitute a magnetic circuit, and a crimp portion that crimps said stack of the plurality of electromagnetic steel plates between said magnet mount portion and said lightening portion.

8. The electric motor for a hybrid vehicle according to claim 4 or 5, wherein said rotor has a stack of electromagnetic steel plates that constitute a magnetic circuit, and a crimp portion that crimps said stack of the electromagnetic steel plates on a periphery of said through hole.

9. The electric motor for a hybrid vehicle according to claim 7, wherein said rotor has a stack of electromagnetic steel plates that constitute a magnetic circuit, and a crimp portion that crimps said stack of the electromagnetic steel plates on a periphery of said through hole.

* * * * *